Feb. 15, 1927. 1,617,931
R. C. WILSON
TORQUE CUSHIONING DEVICE
Filed July 22, 1925 2 Sheets-Sheet 1
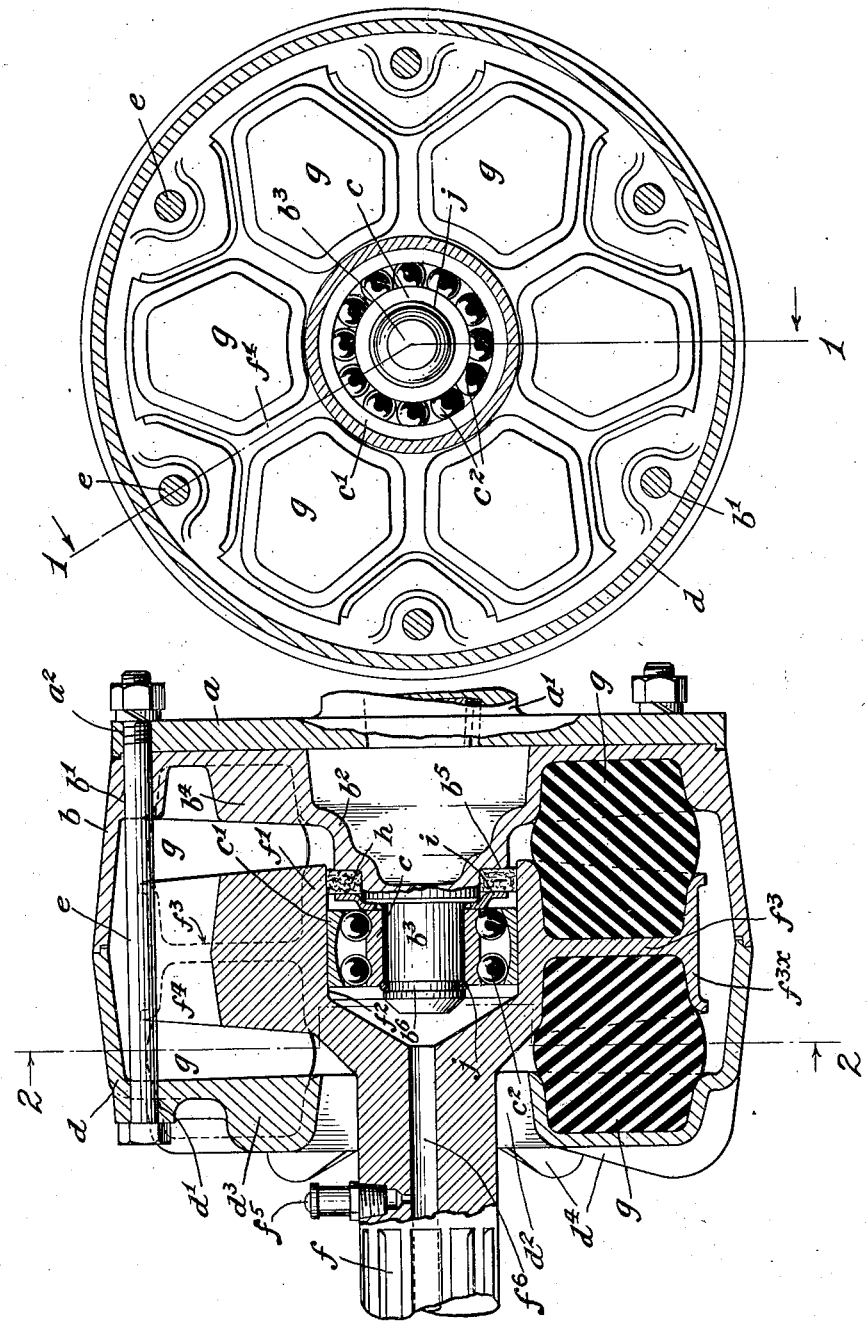
INVENTOR
Raymond C. Wilson
BY
Redding, Greeley, O'Shea & Campbell
his ATTORNEYS Feb. 15, 1927.
R. C. WILSON
1,617,931
TORQUE CUSHIONING DEVICE
Filed July 22, 1925    2 Sheets-Sheet 2
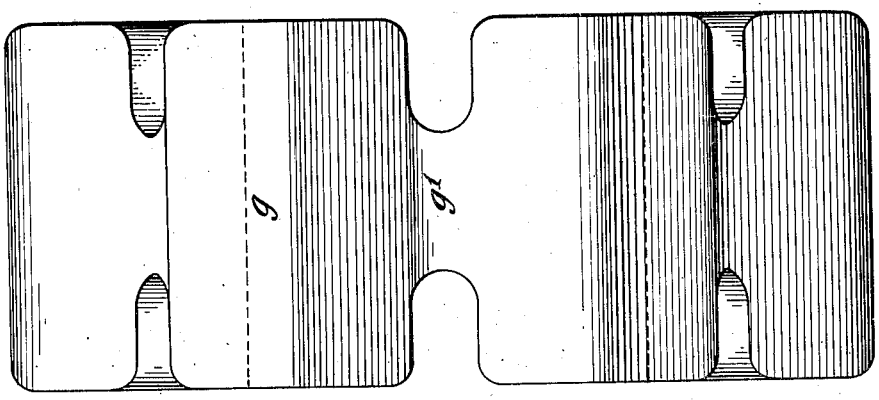
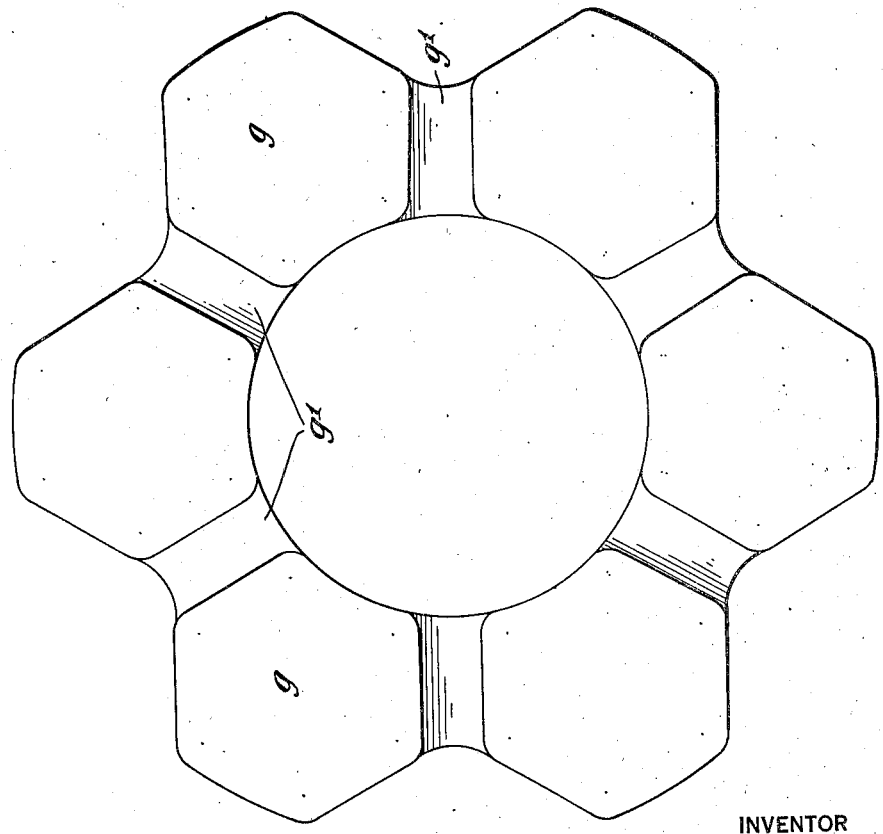
INVENTOR
Raymond C. Wilson
BY
ATTORNEYS Patented Feb. 15, 1927.

1,617,931

UNITED STATES PATENT OFFICE.

RAYMOND C. WILSON, OF WOODSIDE, NEW YORK, ASSIGNOR TO INTERNATIONAL MOTOR COMPANY, OF NEW YORK, N. Y., A CORPORATION OF DELAWARE.

TORQUE-CUSHIONING DEVICE.

Application filed July 22, 1925. Serial No. 45,173.

This invention relates to universal joints or torque cushioning means of the kind in which driving torque and the like is adapted to be cushioned between respective rotatable elements. The invention seeks to provide a construction involving the use of yielding non-metallic material in the form of blocks wherein all the compression load of the blocks is taken by the retaining means therefor and the blocks are under a direct shear load. In accordance with the invention a torque cushioning device is provided for interposition between two rotatable elements between which driving torque is to be transmitted wherein opposed seats for the blocks of yielding non-metallic material on the respective elements are disposed in planes transverse to the axis of rotation. More particularly the invention comprises a housing carried with one of the rotatable elements and a flange carried with the other rotatable element within the housing, opposed seats being formed on the flange and in the housing and the blocks of yielding non-metallic material being retained between the respective opposed seats, preferably under compression, so that the blocks are under shear in the transmission of torque. As a convenient manner of handling the yielding non-metallic blocks and also in order to contribute to the positioning of the blocks within the device a series of the blocks may be incorporated in a unitary annulus by the provision of interconnecting webs. In order that the invention may be clearly understood and readily carried into effect the same will now be described more fully with reference to the accompanying drawings illustrating a preferred embodiment thereof, in which:

Figure 1 is a sectional view showing the torque cushioning device according to the present invention taken in the plane indicated by the broken line 1—1 in Figure 2.

Figure 2 is a transverse vertical view taken in the planes indicated by the broken line 2—2 in Figure 1 and looking in the direction of the arrows.

Figure 3 is a view in elevation and partly in section showing a modification of the assembly of blocks of yielding non-metallic material wherein connecting webs are provided between the respective blocks to prevent the displacement of the individual blocks.

Figure 4 is a view showing the construction illustrated in Figure 3 but looking from the right in that figure.

Referring now to the drawings a driving flange is indicated at $a$ which is adapted to be secured in any convenient manner to the clutch, transmission, brake unit, or rear axle shaft as desired by means of a hub, a fragmentary portion of which is illustrated at $a'$. Secured to the flange $a$ there is illustrated a housing $b$ provided with apertures $b'$ through which bolts may pass securing the same to the flange $a$. Housing $b$ is formed with a central extension $b^2$ provided with a turned portion $b^3$ adapted to receive the inner ball race $c$ of a self-aligning ball bearing. A cover member for the housing $b$ is indicated at $d$ and is shown as provided with apertures $d'$ for through bolts $e$ which pass through apertures $b'$ and apertures $a^2$ in the flange whereby flange, housing and cover are rigidly secured together. Centrally the cover member $d$ is formed with an aperture or opening $d^2$ for the passage of a driven shaft $f$ the end $f'$ of which is enlarged and formed with an axial recess $f^2$ for the reception of the complementary ball race $c'$ between which the balls $c^2$ of the self-aligning ball bearing are disposed. The enlarged portion $f'$ is formed with a flange $f^3$ terminating outwardly in a ring $f^{3x}$ and ribs $f^4$ are disposed radially of the shaft upon either side of the flange. The housing and cover member are formed with corresponding ribs $b^4$, $d^3$, respectively, and these ribs together with the elements upon which they are carried define seats for blocks of yielding non-metallic material $g$. These blocks are preferably formed of rubber and are retained within the seats under compression whereby their strength, resiliency and wearing qualities are improved. It will be noted that the seats between which the blocks are retained are spaced from one another and lie in planes transverse to the axis of rotation of the shafts. Thus the compression load of the blocks is entirely taken by the housing and flange, that is, the seats formed therein, while in the transmission of driving torque the blocks are under a direct shear load.

To provide lubrication for the centering device, a grease gun connection is illustrated at $f^5$, communicating with an axial passage, $f^6$. To seal the space for the centering device and prevent the leakage of lubricant, a packing $h$ of felt or the like may be disposed in an offset portion $b^5$ of the central extension $b^2$ and may be retained in place by means of a resilient clamping ring $i$. Any convenient means may be adopted for positioning the ball race. In the illustrated embodiment a split ring $j$ is disposed within a groove $b^6$ in the end of the turned portion $b^3$.

Considerable heat is generated within the interior of the housing by the action of the blocks and if desired fins $d^4$ may be provided adjacent the aperture $d^2$ to induce a current of air within the interior of the housing.

In the assembly of the device the blocks of yielding non-metallic material are first inserted in the seats in the flange $b$. Felt $h$, felt retainer $i$, ball bearing $c$ and ball bearing lock ring $j$ are mounted on the housing extension $b^3$. Driven shaft $f$ is then placed in position with the seats on the flange $f^3$ engaging the blocks $g$. The other series of blocks $g$ are then disposed in the seats on the opposite side of the flange $f^3$ and the cover member $d$ is next placed over the blocks whereafter the cover, housing and flange $a$ are secured together by the through bolts $e$ so that the compression load of the rubber is entirely taken in the housing. By varying the lengths of the rubber blocks any desired degree of compression in the rubber may be obtained and thereby the angular motion of the joint under load may be controlled. When power is applied through the flange $a$ to the housing $b$ and housing cover $d$ the same is transmitted to the driven shaft $f$ through the blocks $g$ which, it is to be noted, are under a direct shear load. Angular motion of the shafts is taken care of by further compression of some of the blocks $g$ while the compression in other of the blocks is released. All of the compensation for relative movement between the respective elements is accommodated by what may be termed jellying of the rubber there being no relative motion between the rubber blocks and the respective cups in the housing or the cups on the shaft and there is thus no wear of the blocks.

Figures 3 and 4 illustrate a modification of the invention wherein the blocks $g$ are interconnected by means of the webs $g'$ to form a ring for a complete series of blocks.

It will be apparent from the foregoing description that a universal joint or torque cushioning device has been provided for interposition between rotatable elements between which driving torque is to be transmitted, which involves the use of blocks of yielding non-metallic materal wherein the compression load of the blocks is taken by the retaining means therefor while the blocks themselves in the transmission of driving or braking torque are under a direct shear load.

Various modifications may be made in the arrangement, number and configuration of the blocks of yielding non-metallic material as well as in the construction of the seats therefor and no limitation is intended by the foregoing description except as indicated in the accompanying claims.

What I claim is:

1. A torque cushioning device interposed between two rotatable elements between which driving torque is to be transmitted comprising opposed seats carried with one of the elements, seats carried with the other element to co-operate with the respective seats on the first named elements said seats lying, respectively, in planes substantially perpendicular to the axis of rotation, and blocks of yielding non-metallic material disposed between co-operating seats.

2. A torque cushioning device interposed between two rotatable elements between which driving torque is to be transmitted comprising opposed seats carried with one of the elements, seats carried with the other element to co-operate with the respective seats on the first named elements said seats lying, respectively, in planes substantially perpendicular to the axis of rotation, and blocks of yielding non-metallic material disposed between co-operating seats under compression.

3. A torque cushioning device interposed between two rotatable elements between which driving torque is to be transmitted comprising a flange carried with one element, a housing carried with the flange, a cover member carried with the housing, a flange carried with the other member within the housing, opposed seats carried with the housing and flange, respectively, and lying in planes substantially perpendicular to the axis of rotation and blocks of yielding non-metallic material disposed between the seats.

4. A torque cushioning device interposed between two rotatable elements between which driving torque is to be transmitted comprising a flange carried with one element, a housing carried with the flange, a cover member carried with the housing, a flange carried with the other member within the housing, opposed seats carried with the housing and flange, respectively, said seats lying in planes substantially perpendicular to the axis of rotation, blocks of yielding non-metallic material disposed between the seats, and means to retain said blocks under compression.

5. A torque cushioning device interposed between two rotatable elements between which driving torque is to be transmitted comprising a flange carried with one element, a housing carried with the flange, a cover member carried with the housing, a flange carried with the other member within the housing, opposed seats carried with the housing and flange, respectively, said seats lying in planes substantially perpendicular to the axis of rotation, blocks of yielding non-metallic material disposed between the seats, means to retain said blocks under compression, and a centering device between the two rotatable elements.

6. A torque cushioning device interposed between two rotatable elements between which driving torque is to be transmitted comprising blocks of yielding non-metallic material, and seats carried with the respective rotatable elements to place said blocks under a direct shear load in a plane substantially perpendicular to the axis of rotation.

7. A torque cushioning device interposed between two rotatable elements between which driving torque is to be transmitted comprising blocks of yielding non-metallic material, retaining seats for said blocks carried by the respective rotatable elements and taking the compression load of the blocks, and means to transmit torque whereby the blocks are under a direct shear load in a plane substantially perpendicular to the axis of rotation.

8. A torque cushioning device interposed between two rotatable elements between which driving torque is to be transmitted comprising seats carried with one of the elements, opposed seats carried with the other element, said seats being disposed in planes substantially perpendicular to the axis of rotation of the elements, and blocks of yielding non-metallic material retained between the respective seats, said blocks extending between the co-operating seats axially of said rotatable elements.

9. A torque cushioning device interposed between two rotatable elements between which driving torque is to be transmitted comprising seats carried with one of the elements, seats carried with the other element to co-operate with the respective seats on the first named element, blocks of yielding non-metallic material retained between the respective seats, said seats being disposed in planes substantially perpendicular to the axis of rotation of the elements and rigidly engaging spaced portions of the blocks, said blocks extending between the co-operating seats axially of said rotatable elements.

10. In a torque cushioning device to be interposed between two rotatable elements between which driving torque is to be transmitted, a flange carried with one of said elements, opposed seats formed upon both sides of said flange, a housing carried with the other of said elements and adapted to surround said flange, seats formed upon both sides of said housing for co-operation with the opposed seats formed, respectively, upon the two sides of the flange, all of said seats being disposed in planes substantially perpendicular to the axis of rotation of the rotatable elements, blocks of yielding non-metallic material extending between the co-operating seats axially of the rotatable elements, spaced portions of said blocks being rigidly engaged by said seats.

This specification signed this 16th day of July, A. D. 1925.

RAYMOND C. WILSON.